United States Patent [19]

Abrams et al.

[11] 4,063,195
[45] Dec. 13, 1977

[54] PARAMETRIC FREQUENCY CONVERTER

[75] Inventors: Richard L. Abrams, Pacific Palisades; Amnon Yariv, San Marino, both of Calif.

[73] Assignee: Hughes Aircraft Company, Culver City, Calif.

[21] Appl. No.: 670,601

[22] Filed: Mar. 26, 1976

[51] Int. Cl.² .......................... H01S 3/22; H03F 7/02
[52] U.S. Cl. .................................. 332/7.51; 307/88.3; 325/430
[58] Field of Search .................. 332/7.51; 330/4.5; 307/88.3; 325/430

[56] References Cited

U.S. PATENT DOCUMENTS

| 2,714,660 | 8/1955 | Hershberger | 325/430 |
|---|---|---|---|
| 2,909,654 | 10/1959 | Bloomberger | 330/4.5 |
| 3,720,882 | 3/1973 | Tang et al. | 307/88.3 |
| 3,983,406 | 9/1976 | Lax et al. | 307/88.3 |
| 3,984,675 | 10/1976 | Corcoran et al. | 332/7.51 |
| 4,006,363 | 2/1977 | Schlossberg | 307/88.3 |

OTHER PUBLICATIONS

Abrams et al., "10.6 Micron Parametric Frequency Converter," 11/30/75, pp. 1–57, NTIS AD-A017 863/25L, Semi-Annual Tech. Report.
Abrams et al., "10.6 Micron Parametric Frequency Converter," 3/75, pp. 1–34, NTIS AD-009 112/45L, Semiannual Tech. Report.
Landman et al., "Light Modulation by Means of the Stark Effect...," 12/1/69, pp. 357–360, A.P.L. vol. 15, No. 11.

*Primary Examiner*—Nelson Moskowitz
*Attorney, Agent, or Firm*—P. M. Coble; W. H. MacAllister

[57] ABSTRACT

In the disclosed parametric frequency converter a dc electric field is utilized to remove spatial inversion symmetry of $NH_2D$ gas molecules contained in a Stark cell. Simultaneous introduction into the Stark cell of a laser beam at a frequency $f_1$ (e.g., corresponding to about 10.6 μm) and microwaves at a frequency $f_2$ (e.g., about 4.1 GHz) produces resonantly enhanced parametric mixing of the frequencies $f_1$ and $f_2$, resulting in the generation of a laser beam at the difference frequency $f_3 = f_1 - f_2$.

18 Claims, 6 Drawing Figures

Fig. 3.
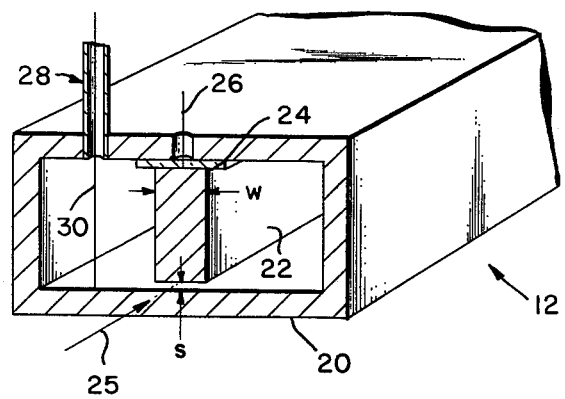
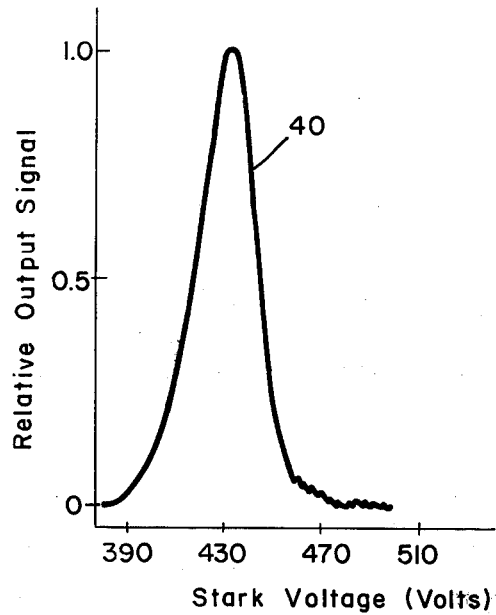
Fig. 5.
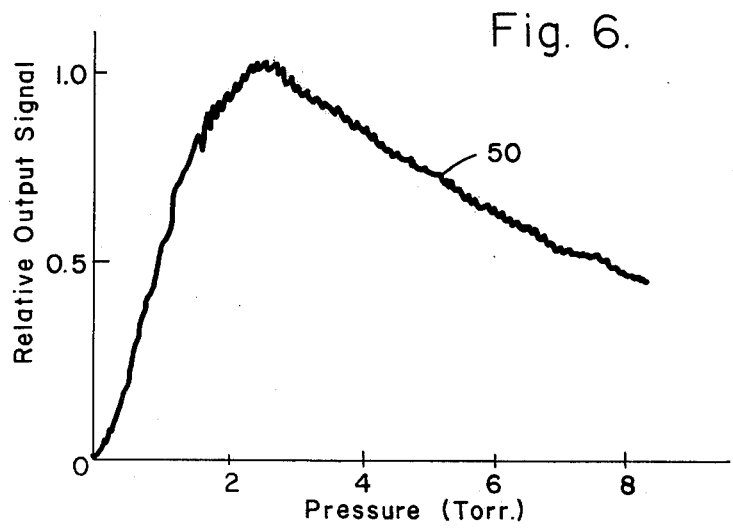
Fig. 6.

PARAMETRIC FREQUENCY CONVERTER

This invention relates generally to frequency conversion. More particularly, it relates to a parametric frequency converter utilizing frequency mixing in a fluid the energy level structure of which is controlled by an applied field.

The invention herein described was made in the course of or under a contract or subcontract thereunder with the United States Navy.

There are numerous applications for which it is desired to utilize a beam of electromagnetic radiation at a particular frequency. In the case of a laser beam, the frequency of the beam depends upon the energy level structure of the medium used in generating the beam. Thus, if one desires a laser beam at a particular frequency he must select the particular laser that most closely fits the desired frequency conditions. Since there are some desired frequencies for which no laser is suitable, a need exists for devices capable of converting generated laser beams to new frequencies.

In the past, the frequency shifting of laser beams has been achieved using crystalline optical parametric devices. However, the crystals which must be employed in these devices are limited in size and, in addition, are readily damaged by the incident laser radiation. Large crystals are expensive, and elaborate arrangements are required to reduce crystal damage as well as to minimize distortion of the optical energy.

It is an object of the present invention to provide an improved parametric frequency converter which does not require the use of any crystal.

It is a further object of the invention to provide a parametric frequency converter, especially suitable for shifting the frequency of a laser beam, which is less expensive, handles more power, and introduces less optical distortion than optical parametric frequency converters of the prior art.

It is a still further object of the invention to provide a simple and efficient single sideband modulator for laser radiation.

A parametric frequency converter according to the invention comprises a cell containing a fluid the atoms or molecules of which have an energy level system including three energy levels, and which energy level system is such that normally transitions involving two of the three paired combinations of these energy levels are allowed but transitions involving the third paired combination of the energy levels are forbidden by symmetry. A field is generated within the cell to produce sufficient mixing of one of the energy levels of the paired combination involving the normally forbidden transition with the energy level not in this paired combination such that transitions in all three of the paired combinations of energy levels are allowed.

Electromagnetic radiation at a first frequency corresponding substantially to the energy difference between two of the three energy levels is introduced into the cell, while electromagnetic radiation at a second frequency corresponding substantially to the energy difference between one of the aforementioned two energy levels and the third energy level is also introduced into the cell. Parametric frequency mixing occurs in the fluid to produce electromagnetic radiation at a third frequency equal to the sum or difference frequency of the first and second frequencies.

In a preferred embodiment of the invention, a laser beam at the first frequency and microwave energy at the second frequency are introduced into a Stark cell containing a gas the energy level structure of which is controlled by an electric field to produce parametric frequency mixing at the first and second frequencies and thereby generate a laser beam at a frequency equal to the difference between the first and second frequencies.

Additional objects, advantages and characteristic features of the invention will become apparent from the following detailed description of a preferred embodiment of the invention when considered in conjunction with the accompanying drawings wherein:

FIG. 3 is a cross-sectional perspective view showing a particular microwave Stark cell which may be employed in the parametric frequency converter of FIG. 2;

FIG. 5 is a graph showing the relative magnitude of the output signal as a function of the voltage applied to the Stark cell of FIG. 3 in a parametric frequency converter according to the aforementioned preferred embodiment of the invention; and FIG. 6 is a graph illustrating the relative magnitude of the output signal as a function of the gas pressure within the Stark cell of FIG. 3 in a parametric frequency converter according to the aforesaid preferred embodiment of the invention.

Figure 1:
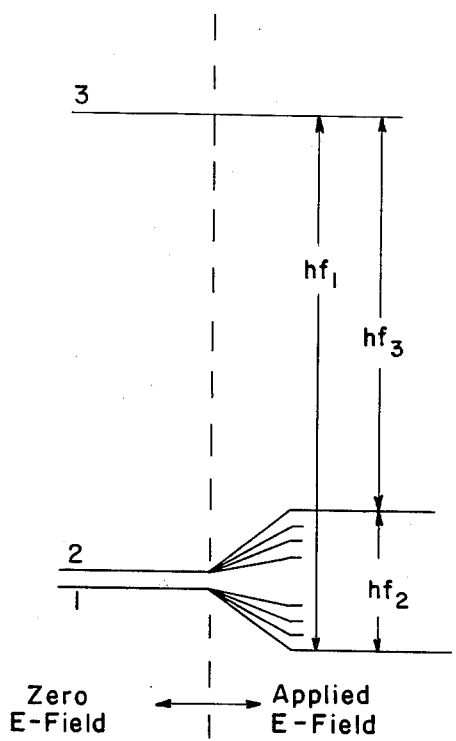
FIG. 1 is a simplified energy level diagram of a molecular system capable of producing parametric frequency conversion in accordance with the invention.

Referring to FIG. 1 with greater particularity, a simplified energy level diagram is shown for a molecular system capable of producing parametric frequency conversion in accordance with the invention. In a preferred embodiment of the invention molecules of the gas deuterated ammonia ($NH_2D$) are employed. However, it should be understood that atoms of molecules of other gases, such as methyl fluoride ($CH_3F$), as well as of liquids may be used instead.

As shown in FIG. 1, the system has three energy levels designated 1, 2 and 3. In the absence of an applied electric field, transitions involving two of the three paired combinations of the energy levels 1, 2 and 3 are allowed but transitions involving the third paired combination of these energy levels are forbidden by symmetry.

When an electric field is applied to the aforementioned molecular system, the symmetry is broken, energy levels 1 and 2 become mixed, and transitions are allowed in all of the three paired combinations of the energy levels 1, 2 and 3. Under these circumstances, simultaneous application of electromagnetic radiation at a frequency $f_1$ (corresponding to the energy difference between levels 1 and 3) and at a frequency $f_2$ (corresponding to the energy difference between levels 1 and 2) to the molecular system results in the parametric generation of electromagnetic radiation at a new frequency $f_3 = f_1 - f_2$ (corresponding to the energy difference between levels 2 and 3).

Figure 2:
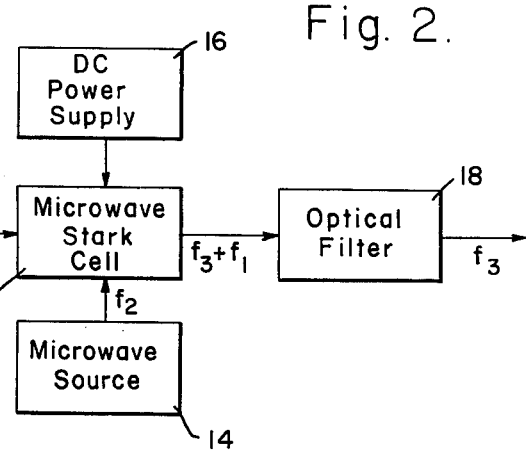
FIG. 2 is a block diagram illustrating a parametric frequency converter according to a preferred embodiment of the invention.

In a preferred embodiment of the invention laser radiation and microwave radiation are parametrically mixed in a microwave Stark cell to generate a single sideband laser radiation component at the difference frequency between the laser and microwave frequencies. As shown in FIG. 2, laser radiation at the frequency $f_1$ is generated by a laser 10 and is introduced into a microwave Stark cell 12. As a specific illustrative example, the laser 10 may be a $CO_2$ laser utilizing the P(20) 10.6 μm laser transition, although it should be understood that other lasers as well as other $CO_2$ laser transitions may be employed instead. Microwave energy at the frequency $f_2$, generated by a microwave source 14 such as a klystron or traveling-wave tube, is also introduced into the Stark cell 12.

A dc voltage, generated by a dc power supply 16, is applied to the Stark cell 12 to provide the appropriate electric field within the Stark cell 12 to condition the gas molecules contained therein by removing the symmetry as discussed above and thereby enable parametric signal generation to be achieved. The Stark cell 12 thus provides output radiation at the frequency $f_3$ in the form of a single sideband laser radiation component. A narrow band optical filter 18, such as a Fabry-Perot interferometer tuned to the frequency $f_3$, may be disposed in the path of the output radiation from the Stark cell 12 to separate radiation at the frequency $f_3$ from any remaining radiation at the frequency $f_1$ which may emerge from the Stark cell 12.

A particular microwave Stark cell 12 which may be employed in the parametric frequency converter of FIG. 2 is illustrated in FIG. 3. The Stark cell 12 of FIG. 3 comprises a rectangular waveguide 20 containing a longitudinally disposed electrically conductive ridge member 22. The ridge member 22 may be attached to a thin layer 24 of insulating material such as Teflon which is disposed between the member 22 and a broad wall of the waveguide 20. The ridge member 22 has a width w and is spaced from the opposite broad wall of the waveguide 20 by an elongated gap of spacing s along which laser beam 25 from the laser 10 traverses the cell 12. As a specific example for illustrative purposes, the cell 12 may have a length of 20 cm, a ridge width w of 5 mm and a gap spacing s of 1.2 mm. A dc bias voltage from the power supply 16 may be applied to the ridge member 22 by means of a conductor 26 extending through insulating layer 24 and insulated from waveguide 20. Microwaves from the source 14 may be coupled into the Stark cell 12 by means of a coaxial transmission line 28 having an inner conductor which terminates in a coupling probe 30 extending into the waveguide 20 near the laser beam input end.

Electrically conductive plates (not shown) may be disposed at the respective ends of the Stark cell 12 to serve as microwave reflectors and provide a microwave resonant cavity, thereby reducing the required microwave input power. In a preferred embodiment of the invention the Stark cell 12 may be made resonant at a frequency of about 4.1 GHz (the frequency of the incoming microwaves) with a Q of about 50. The resonant frequency of the cell 12 may be adjusted by means of an external triple stub tuner (not shown). Alternatively, the Stark cell 12 may be operated as a non-resonant transmission line for wideband applications.

Figure 4:
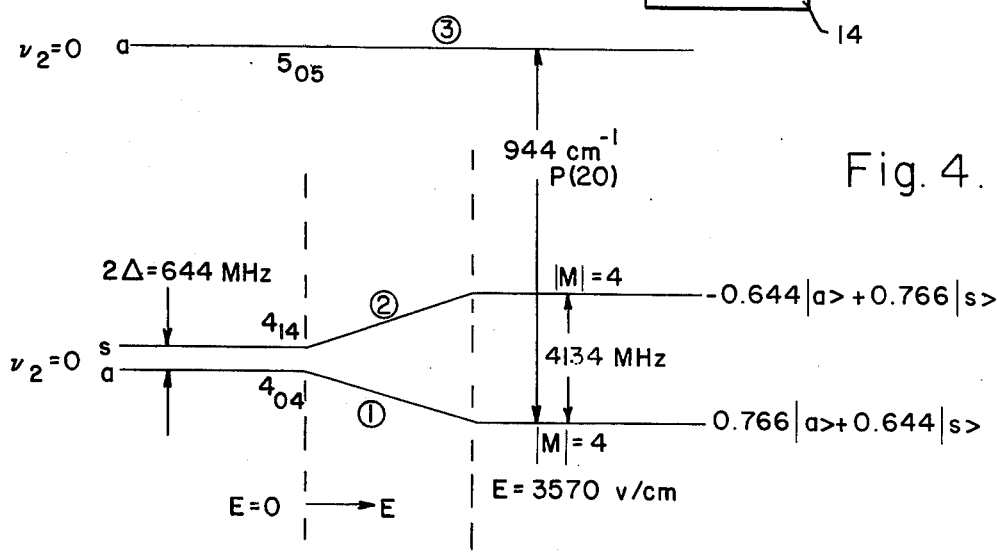
FIG. 4 is a more detailed energy level diagram for molecules of a particular gas which may be employed in the parametric frequency converter of FIG. 2.

The Stark cell 12 is filled with a suitable fluid capable of producing parametric frequency conversion in the presence of an applied electric field. A specific exemplary fluid which may be employed when the frequency $f_1$ of the input laser radiation corresponds to 10.6 μm is deuterated ammonia ($NH_2D$) gas. An energy level diagram more detailed than that of FIG. 1 for molecules of $NH_2D$ is given in FIG. 4. The encircled numerals 1, 2 and 3 in FIG. 4 represent the respective energy levels 1, 2 and 3 shown in FIG. 1, the standard notation for asymmetric top molecular energy levels also being given in FIG. 4. Energy levels 1 and 2 are nearly degenerate with a (zero field) splitting of 644 MHz.

In the absence of an electric field the dipole matrix element for transitions between energy levels 2 and 3

$$<2|\mu|3> = 0 \qquad (1)$$

by symmetry, and transitions are fobidden between levels 2 and 3 (transitions being allowed between levels 1 and 2 and between levels 1 and 3).

The application of a dc electric field to the aforementioned $NH_2D$ molecules causes a quasilinear Stark splitting of energy levels 1 and 2 as shown in the right portion of FIG. 4. The dc field produces an admixture of energy levels 1 and 2, thereby destroying the vibrational symmetry. As a result, transitions become allowed between energy levels 2 and 3 (and remain allowed between levels 1 and 2 and between levels 1 and 3). At an electric field of 3570 volts/cm the transition energy $hf_1$ between energy levels 1 and 3 (where $h$ is Planck's constant) is equal to the photon energy of P(20) $CO_2$ laser radiation at 944 cm$^{-1}$, and the splitting between levels 1 and 2 corresponds to a frequency $f_2$ of 4134 MHz. Moreover, at this electric field value, the dipole matrix elements for the mixed levels 1 and 2 become $$|2> = -0.644|a> + 0.766|s> \qquad (2)$$

$$|1> = 0.766|a> + 0.644|s> \qquad (3)$$

When the $NH_2D$ molecules are so conditioned by the applied dc electric field, the simultaneous introduction of a laser beam at the frequency $f_1$ and microwaves at the frequency $f_2$ into the Stark cell 12 produces resonantly enhanced parametric mixing of the frequencies $f_1$ and $f_2$ which results in the generation of a laser beam at the difference frequency $f_3 = f_1 - f_2$. The generated laser beam at the frequency $f_3$, which may be viewed as a lower single sideband component of laser carrier radiation at the frequency $f_1$, is provided as an output from the Stark cell 12.

It is pointed out that the frequencies $f_1$ and $f_2$ of the input radiation to the Stark cell 12 need not correspond exactly to the frequency separation between the energy levels in question, i.e., be in exact resonance with these levels, although as the input frequencies depart from the resonant values some loss in efficiency is experienced. Moreover, parametric frequency conversion in accordance with the invention occurs over a range of electric field values, since some (but not optimum) mixing of the energy levels 1 and 2 occurs over a range of electric field values as controlled by the dc voltage applied to the Stark cell 12. The relative magnitude of the parametrically generated signal at the frequency $f_3$ as a function of the dc voltage applied to the Stark cell 12 for the aforedescribed specific exemplary arrangement is illustrated by curve 40 of FIG. 5. It may be seen from the curve 40 that maximum conversion to the frequency $f_3$ occurs at a Stark voltage of about 428 volts.

The efficiency of conversion to the frequency $f_3$ is also affected by the pressure of the gas within the Stark cell 12. The relative magnitude of the parametrically generated signal at the frequency $f_3$ as a function of the gas pressure within the Stark cell 12 for the aforedescribed specific exemplary arrangement is illustrated by curve 50 of FIG. 6. It may be seen from the curve 50 that maximum conversion to the frequency $f_3$ occurs at a Stark cell gas pressure of about 2.4 Torr, with the conversion efficiency decreasing more slowly as the pressure is increased from its optimum value than when the pressure is decreased from this value.

It will be apparent that since a parametric frequency converter according to the invention employs a contained volume of fluid rather than a crystal, the fluid volume can be readily increased to provide greater power handling capabilities than has been achievable with parametric frequency converters using crystals. In addition, problems with crystal damage and the need for elaborate and expensive crystal control arrangements are eliminated. Thus, a simpler, less expensive parametric frequency converter is provided which introduces less optical distortion than optical parametric frequency converters of the prior art.

It is further pointed out that while the aforedescribed preferred embodiment of the invention utilizes an electric field to condition the atoms or molecules of the working fluid in accordance with the Stark effect, alternatively, the Zeeman effect could be employed by applying a magnetic field to the working fluid. Moreover, while the aforementioned embodiment develops an output signal at a frequency equal to the difference between a pair of input frequencies, an atomic or molecular system could be employed which develops an output frequency at the sum of the input frequencies instead.

Thus, although the present invention has been shown and described with reference to a particular embodiment, nevertheless various changes and modifications which are obvious to a person skilled in the art to which the invention pertains are deemed to lie within the spirit, scope and contemplation of the invention.

What is claimed is:

1. A parametric frequency converter comprising:
   a cell containing a fluid the elementary particles of which have an energy level system including three energy levels, said energy level system being such that normally electric dipole transitions involving two of the three paired combinations of said energy levels are allowed but electric dipole transitions involving the third paired combination of said energy levels are forbidden by symmetry;
   means for generating a dc electric field within said cell producing sufficient mixing of one of the energy levels of said third paired combination with the energy level not in said third paired combination such that electric dipole transitions are allowed in all of the paired combinations of said three energy levels;
   means for introducing into said cell electromagnetic radiation at a first frequency corresponding substantially to the energy difference between two of said three energy levels; and
   means for introducing into said cell electromagnetic radiation at a second frequency corresponding substantially to the energy difference between one of said two energy levels and the third energy level, whereby parametric frequency mixing occurs in said fluid to produce electromagnetic radiation at a third frequency corresponding substantially to the energy difference between the other of said two energy levels and said third energy level.

2. A parametric frequency converter according to claim 1 and further including filter means disposed in the path of electromagnetic radiation emerging from said cell for passing electromagnetic radiation substantially at said third frequency while rejecting electromagnetic radiation substantially at said first and said second frequencies.

3. A parametric frequency converter according to claim 1 wherein said fluid is a gas, and said cell is a Stark cell.

4. A parametric frequency converter according to claim 3 wherein said electromagnetic radiation at said first frequency is a laser beam, said electromagnetic radiation at said second frequency is microwave energy, and said electromagnetic radiation at said third frequency is a laser beam.

5. A parametric frequency converter according to claim 4 and further including a narrow band optical filter disposed in the path of laser radiation emerging from said Stark cell and tuned to substantially said third frequency.

6. A parametric frequency converter according to claim 4 wherein said Stark cell includes a microwave cavity resonant at substantially said second frequency.

7. A parametric frequency converter comprising:
   a cell containing a fluid the elementary particles of which have an energy level system including first, second and third energy levels, said second level having a greater energy than said first level and said third level having a greater energy than said second level, said energy level system being such that normally electric dipole transitions involving two of the three paired combinations of said energy levels are allowed but electric dipole transitions involving the third paired combination of said energy levels are forbidden by symmetry;
   means for generating a dc electric field within said cell producing sufficient mixing of one of the energy levels of said third paired combination with the energy level not in said third paired combination such that electric dipole transitions are allowed in all of the paired combinations of said first, second and third energy levels;
   means for introducing into said cell electromagnetic radiation at a first frequency corresponding substantially to the energy difference between said first and third energy levels; and
   means for introducing into said cell electromagnetic radiation at a second frequency corresponding substantially to the energy difference between said second energy level and a selected one of said first and third energy levels, whereby parametric frequency mixing occurs in said fluid to produce electromagnetic radiation at a third frequency equal to the difference between said first and second frequencies.

8. A parametric frequency converter according to claim 7 wherein said fluid is a gas, and said cell is a Stark cell.

9. A parametric frequency converter according to claim 8 wherein said electromagnetic radiation at said first frequency is a laser beam, said electromagnetic radiation at said second frequency is microwave energy, and said electromagnetic radiation at said third frequency is a laser beam.

10. A parametric frequency converter according to claim 9 and further including a narrow band optical filter disposed in the path of laser radiation emerging from said Stark cell and tuned to substantially said third frequency.

11. A parametric frequency converter according to claim 9 wherein said Stark cell includes a microwave cavity resonant at substantially said second frequency.

12. A parametric frequency converter according to claim 9 wherein said gas is deuterated ammonia, said elementary particles are molecules, said first frequency corresponds to about 10.6 μm, and said second frequency is about 4.1 GHz.

13. A parametric frequency converter comprising:
a cell containing a fluid the molecules of which have an energy level system including first, second and third energy levels, said second level having a greater energy than said first level and said third level having a greater energy than said second level, said energy level system being such that normally electric dipole transitions between said first and second energy levels and between said first and third energy levels are allowed but electric dipole transitions between said second and third energy levels are forbidden by symmetry;
means for generating a dc electric field within said cell of a value producing sufficient mixing of said first and second energy levels such that electric dipole transitions are allowed between said second and third energy levels as well as between said first and second energy levels and between said first and third energy levels;
means for introducing into said cell electromagnetic radiation at a first frequency corresponding substantially to the energy difference between said first and third energy levels; and
means for introducing into said cell electromagnetic radiation at a second frequency corresponding substantially to the energy difference between said first and second energy levels, whereby parametric frequency mixing occurs in said fluid to produce electromagnetic radiation at a third frequency equal to the difference between said first and second frequencies.

14. A parametric frequency converter according to claim 13 wherein said fluid is a gas, and said cell is a Stark cell.

15. A parametric frequency converter according to claim 14 wherein said electromagnetic radiation at said first frequency is a laser beam, said electromagnetic radiation at said second frequency is microwave energy, and said electromagnetic radiation at said third frequency is a laser beam.

16. A parametric frequency converter according to claim 15 and further including a narrow band optical filter disposed in the path of laser radiation emerging from said Stark cell and tuned to substantially said third frequency.

17. A parametric frequency converter according to claim 15 wherein said Stark cell includes a microwave cavity resonant at substantially said second frequency.

18. A parametric frequency converter according to claim 15 wherein said gas is deuterated ammonia, said first frequency corresponds to about 10.6 μm, and second frequency is about 4.1 GHz.

* * * * *